C. W. GAUTHIER.
PANS FOR FREEZING FISH.

No. 187,122.          Patented Feb. 6, 1877.

WITNESS.

INVENTOR.

UNITED STATES PATENT OFFICE.

CHARLES W. GAUTHIER, OF SANDWICH, ONTARIO, CANADA.

IMPROVEMENT IN PANS FOR FREEZING FISH.

Specification forming part of Letters Patent No. 187,122, dated February 6, 1877; application filed November 25, 1876.

*To all whom it may concern:*

Be it known that I, CHARLES W. GAUTHIER, of Sandwich, in the county of Essex and Province of Ontario, Canada, have invented an Improvement in Pans for Freezing Fish, of which the following is a specification:

The object I have in view is to provide a pan, or a number of pans, in which fresh fish may be frozen in such form as to permit of their being packed in the frozen state in barrels without liability of being broken, and, in the freezing process, to prevent the fish from being frozen together, thereby avoiding any liability to break or mutilate the fish when separated.

These pans are more particularly designed as an improvement on those described in Letters Patent No. 161,596, issued April 6, 1875, to D. W. and S. H. Davis, "Preparing fish for market," wherein the fish to constitute a layer in the barrel are frozen in a solid cake, as seen in Fig. 3 of the said Letters Patent.

Figure 1:
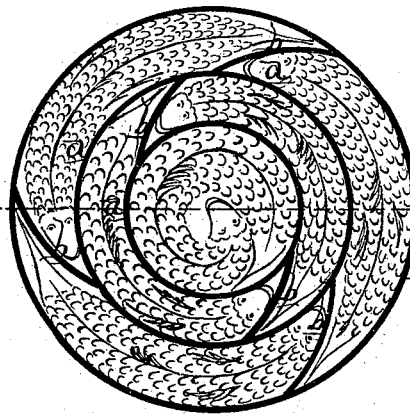
Figure 2:
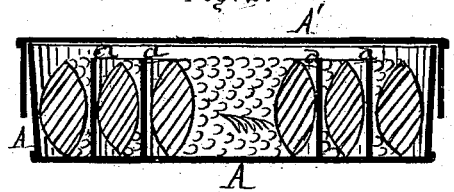

Figure 1 is a plan of my freezing-pan, uncovered, and filled with fish. Fig. 2 is a cross-section of the pan.

In the drawing, A represents a pan provided with a cover, A', and partitions $a$ $a$ which form several chambers, into which the fish are placed, backs up, the head of one overlapping the tail of the next, but separated therefrom by inserting between them a loose plate, $b$. The cover is then pressed down upon the fish, and the pan is then placed in the freezing-chamber until its contents are frozen solid, when the pan is taken out, the cover lifted off, and the fish removed singly, but in such form as to be packed solidly in the box or barrel, ready for transportation.

Where fish are frozen together to form a cake, they are liable to be broken in two, or to be mutilated in attempting to separate them; hence the importance of keeping them apart while being frozen, and yet have them in such form as to stow compactly in the cask.

The boxes may be made rectangular or circular, as may be desired or required, in order that the frozen fish may be packed in receptacles of corresponding shape for shipment.

What I claim as my invention is—

A freezing-pan divided into chambers provided with loose plates $b$, for subdividing said chambers, and with a cover, substantially as and for the purposes described.

CHARLES WILLIAM GAUTHIER.

Witnesses:
WM. P. SPALDING,
H. S. SPRAGUE.